United States Patent
Jiang et al.

(10) Patent No.: US 7,339,147 B2
(45) Date of Patent: Mar. 4, 2008

(54) SYSTEM AND METHOD FOR AUTOMATIC FOCUSING OF IMAGES

(75) Inventors: Li Jiang, Guangdong (CN); Chih-Kuang Chang, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 64 days.

(21) Appl. No.: 11/164,670

(22) Filed: Dec. 1, 2005

(65) Prior Publication Data
US 2006/0197005 A1 Sep. 7, 2006

(30) Foreign Application Priority Data
Dec. 10, 2004 (TW) .............................. 93138282 A

(51) Int. Cl.
G02B 7/04 (2006.01)
G02B 27/40 (2006.01)
G02B 27/64 (2006.01)

(52) U.S. Cl. .................... 250/201.2; 348/345

(58) Field of Classification Search .. 250/201.2–201.4, 250/201.7, 201.8; 348/272, 273, 345, 347, 348/350, 354, 355, 556
See application file for complete search history.

(56) References Cited

U.S. PATENT DOCUMENTS

| 5,398,078 | A  | * | 3/1995 | Masuda et al. | ............. 348/699 |
| 5,633,491 | A  | * | 5/1997 | Kasdan | ................... 250/201.3 |
| 5,767,989 | A  | * | 6/1998 | Sakaguchi | .................. 358/474 |
| 6,917,386 | B2 |   | 7/2005 | Ito et al. | |
| 2001/0022622 | A1 | * | 9/2001 | Eiho et al. | .................. 348/252 |
| 2004/0066563 | A1 | * | 4/2004 | Voss et al. | .................. 359/698 |

FOREIGN PATENT DOCUMENTS

JP 08122623 5/1996

* cited by examiner

Primary Examiner—Georgia Epps
Assistant Examiner—Francis M LeGasse, Jr.
(74) Attorney, Agent, or Firm—Winston Hsu

(57) ABSTRACT

A method for automatic focusing of images, which is typically used in image measuring. Key aspects of the method involve a step of controlling a moveable part to move within a predetermined focusing area, a step of processing consecutive images to obtain definition values of the consecutive images, and a step of calculating a focus location of the consecutive images. In particular, if it is the second time to focus the images, the method involves the step of calculating the focus location of the consecutive images.

9 Claims, 3 Drawing Sheets

SYSTEM AND METHOD FOR AUTOMATIC FOCUSING OF IMAGES

FIELD OF THE INVENTION

The present invention generally relates to systems and methods for image measuring, and more particularly to a system and method for focusing of images.

DESCRIPTION OF RELATED ART

A Charge Coupled Device (CCD) is an electrical device that is used to create images of objects, store information (analogous to the way a computer stores information), or transfer electrical charge (as part of larger device). It receives as input light from an object or an electrical charge. The CCD takes this optical or electronic input and converts it into an electronic signal—the output. The electronic signal is then processed by some other equipment and/or software to either produce an image or to give the user valuable information.

CCDs are used in a variety of different imaging devices, such as imagers or CCD cameras or scanners, in which, CCDs are only part of the whole device. For gathering images of objects, a lens is required to properly focus the incident radiation from the object onto the array.

China Pat. No. 2,321,022Y, entitled "auto-focusing apparatus" and issued on May 26, 1999 discloses an auto-focusing apparatus set on a scanner. The apparatus includes: a lens position adjusting unit which can adjust positions of a lens, a CCD position adjusting unit which can adjust positions of the CCD, and a controlling unit which can control the lens position adjusting unit and the CCD position adjusting unit. When turned on, the scanner can adjust the lens and the CCD to a suitable location according to the lens' required optical path and foci when imaging, so as to make objects focused and imaged on the CCD.

However, the above-mentioned invention is only to adjust hardware apparatuses in order to actualize focusing, so it is difficult to ensure focusing precision.

Therefore, what is needed is a system and method for automatic focusing of images, which can ensure focusing precision.

SUMMARY OF INVENTION

One embodiment of the present invention provides a system for automatic focusing of images as described herein. The system includes a measure machine and a computer. The measure machine has a moveable part, which is installed with a Charge Coupled Device (CCD) and a motor. The computer is connected with the CCD by an image acquisition card and connected with the motor by a controlling card.

The computer includes an inputting/outputting module, a parameter setting module, a calculating module, a data storing module, a determining module, and a processing module.

The inputting/outputting module is used for retrieving consecutive images of objects on the measure machine from the CCD, outputting instructions to the motor for controlling the moveable part to move within a predetermined focusing area, and outputting a focus location of the consecutive images. The parameter setting module is used for setting particular parameters required for focusing images, and setting a start location and an end location for the moveable part of the measure machine according to an approximate focus location and the predetermined focusing area. The calculating module is used for calculating definition values of the consecutive images, and obtaining a corresponding focus location according to the definition values. The determining module is used for determining whether the moveable part has arrived at the end location, and determining whether it is the second time to focus the images when the moveable part has arrived at the end location.

Another embodiment of the present invention provides a method for automatic focusing of images. The method includes the steps of: (a) sending an instruction from a computer to a motor which is installed on a moveable part of a measure machine; (b) setting particular parameters required for focusing images, and setting a start location and an end location for the moveable part of the measure machine; (c) controlling the moveable part of the measure machine to move within a predetermined focusing area from the start location; (d) retrieving consecutive images of objects on the measure machine acquired by a Charge Coupled Device (CCD) which is installed on the moveable part of the measure machine; (e) pretreating the consecutive images; (f) calculating definition values of the consecutive images; (g) determining whether the moveable part of the measure machine has arrived at the end location; (g) determining whether it is the second time to focus the images, if the moveable part of the measure machine has arrived at the end location; (h) calculating a focus location of the consecutive images according to the calculated definition values, if it is the second time to focus the images; and (i) outputting the calculated focus location.

Other objects, advantages and novel features of the embodiments will be drawn from the following detailed description together with the attached drawings, in which:

DETAILED DESCRIPTION

Figure 1:
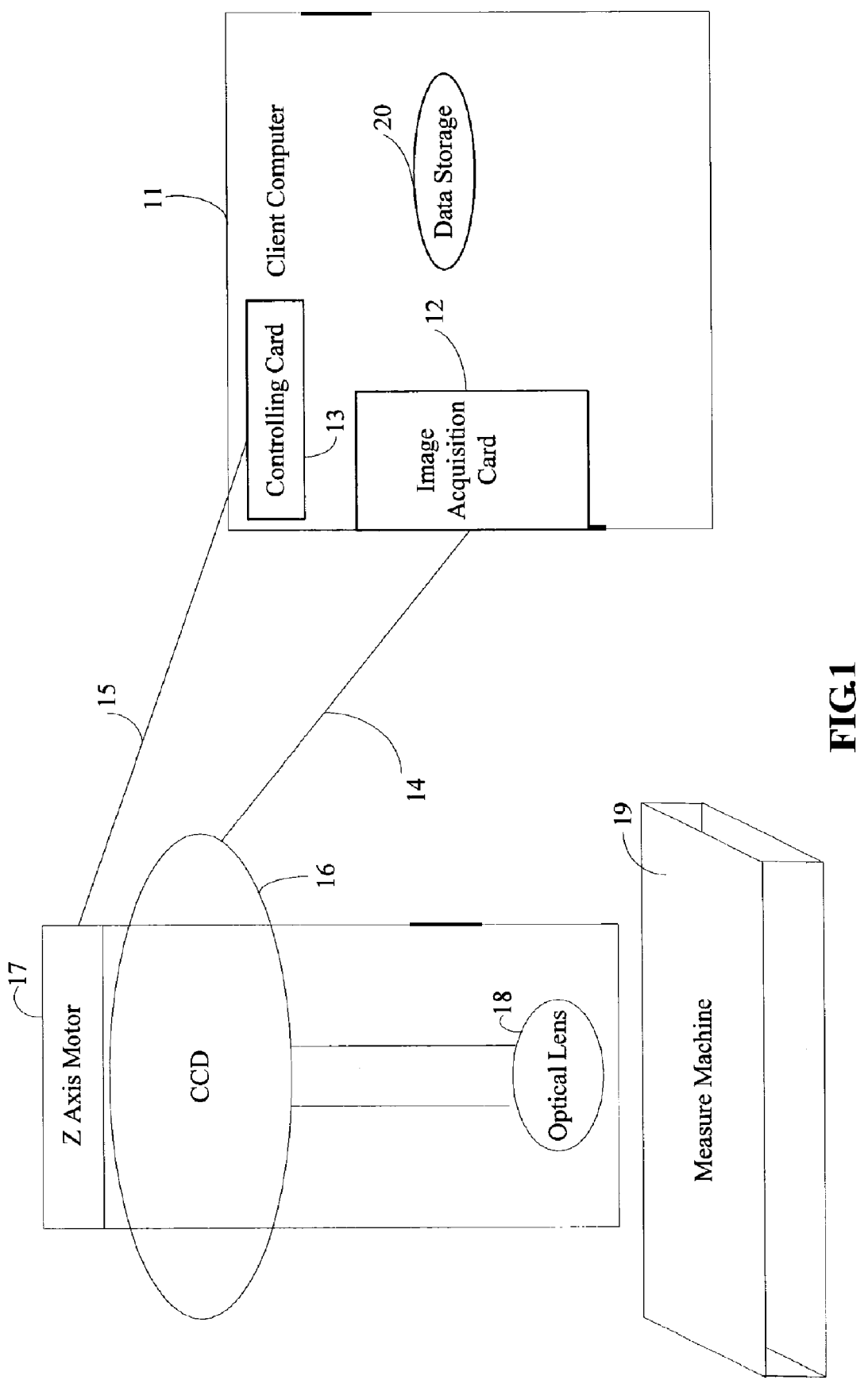
FIG. 1 is a schematic diagram of hardware configuration and an application environment of a system for automatic focusing of images in accordance with a preferred embodiment of the present invention.

FIG. 1 is a schematic diagram of hardware configuration and an application environment of a system for automatic focusing of images (hereinafter, "the system"), in accordance with a preferred embodiment of the present invention. The system includes a client computer 11, and a measure machine 19 for objects to be laid thereon for measurement. A Charge Coupled Device 16 (hereinafter, "CCD 16") is installed on a moveable part of the measure machine 19. The moveable part moves along a Z axis of the measure machine 19 while maintaining a same position relative to an X axis and a same position relative to a Y axis of the measure machine 19. The CCD 16 is used for acquiring consecutive images of the objects on the measure machine 19, by utilizing an optical lens 18 which is installed in front of the CCD 16. The client computer 11 includes an image acquisition card 12, a controlling card 13, and a data storage 20. The CCD 16 is connected with the image acquisition card 12 via an image signal bus 14, through which the CCD 16 can transmit electrical signals of the consecutive images acquired from the measure machine 19 to the image acquisition card 12. The controlling card 13 is connected with a Z axis motor 17 installed on the moveable part of the measure machine 19 via a control signal bus 15, through which the controlling card 13 can send instructions to the Z axis motor 17 for controlling the moveable part of the measure machine 19 to move within a predetermined focusing area. The data storage 20 is used for storing definition values of the consecutive images and respective locations of the moveable part of the measure machine 19.

Figure 2:
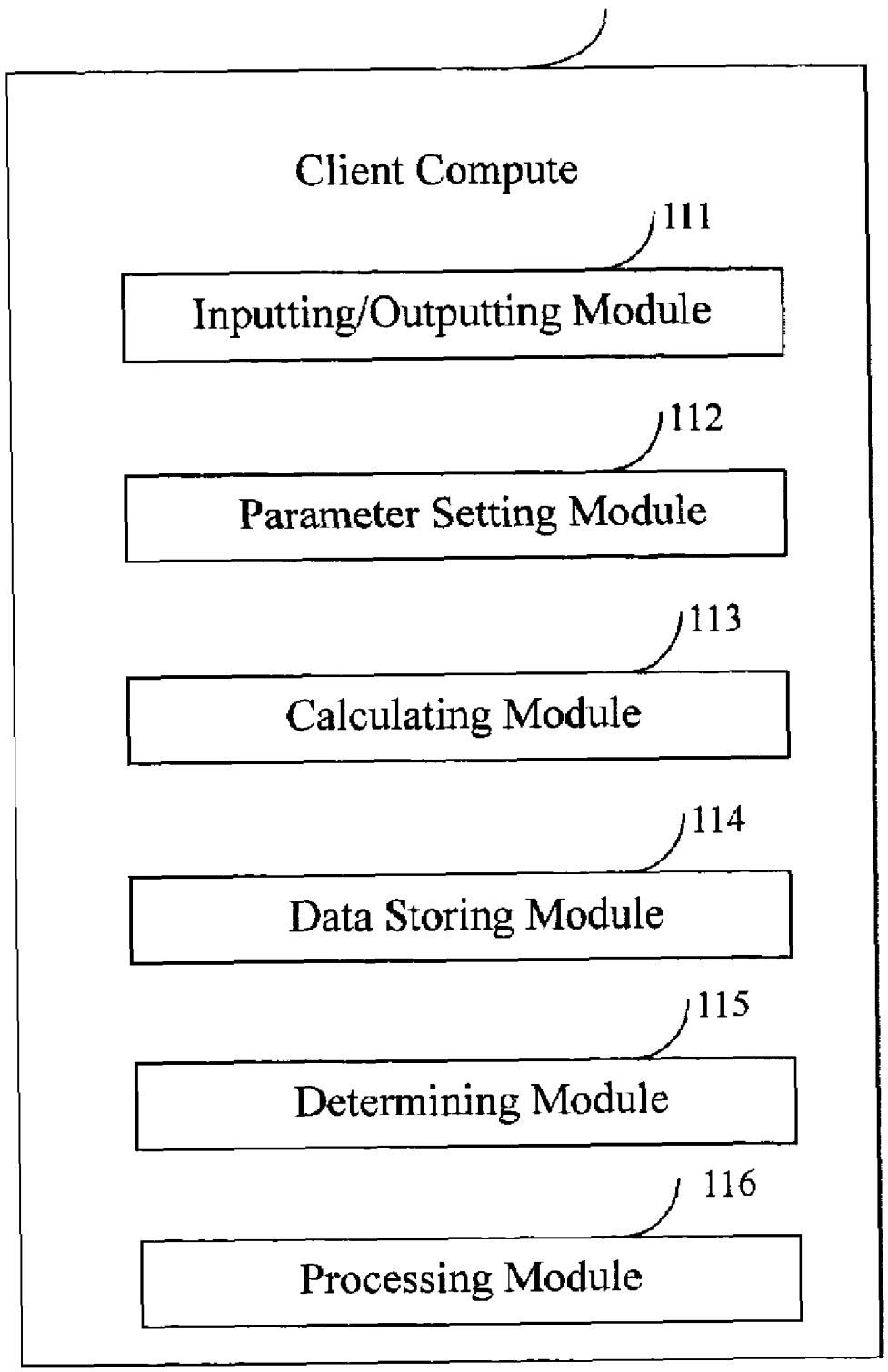
FIG. 2 is a schematic diagram of main function modules of a client computer of the system of FIG. 1.

FIG. 2 is a schematic diagram of main function modules of the client computer 11. The client computer 11 includes an inputting/outputting module 111, a parameter setting module 112, a calculating module 113, a data storing module 114, a determining module 115, and a processing module 116. The inputting/outputting module 111 is used for retrieving the consecutive images of the objects on the measure machine 19 from the CCD 16, by utilizing the image acquisition card 12. The consecutive images are gathered by the optical lens 18 and acquired by the CCD 16. The inputting/outputting module 111 is also used for outputting instructions to the Z axis motor 17 by utilizing the controlling card 13, for the Z axis motor 17 to drive the moveable part of measure machine 19 to move within a predetermined focusing area. The inputting/outputting module 111 is further used for outputting a focus location of the consecutive images on a graphical user interface of the client computer 11. The parameter setting module 112 is used for setting particular parameters required for focusing images, and setting a start location and an end location for the moveable part of the measure machine 19 according to an approximate focus location and the predetermined focusing area. The particular parameters include a parameter regarding whether to filter the consecutive images, and a parameter regarding an image calculating region. The calculating module 113 is used for calculating definition values of the consecutive images, and obtaining a corresponding focus location according to the definition values. The data storing module 114 is used for storing the calculated definition values of the consecutive images and respective locations of the moveable part of the measure machine 19 temporarily in the data storage 20. The determining module 115 is used for determining whether the moveable part of the measure machine 19 has arrived at the end location. If the moveable part has not arrived at the end location, the Z axis motor 17 controls the moveable part to keep on moving towards the end location. The determining module 115 further determines whether it is the second time to focus the images when the moveable part has arrived at the end location. The processing module 116 is used for analyzing and pretreating the consecutive images. The pretreatment may include clearing data temporarily stored in the data storage 20 and filtering the consecutive images.

Figure 3:
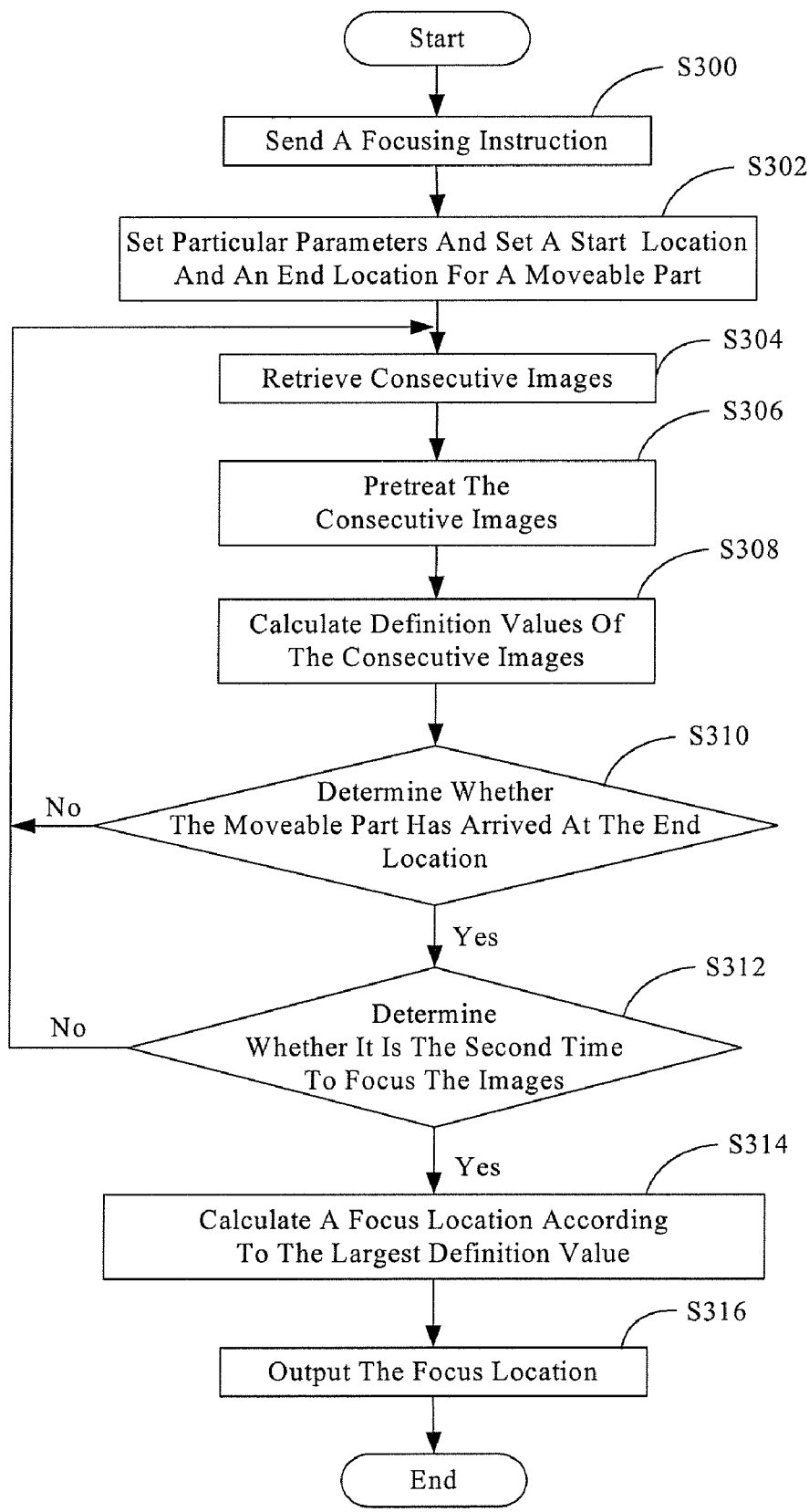
FIG. 3 is a flow chart of a preferred method for automatic focusing of images by utilizing the system of FIG. 1.

FIG. 3 is a flow chart of a preferred method for automatic focusing of images by utilizing the system of FIG. 1. In step S300, the client computer 11 sends a focusing instruction to the controlling card 13. In step S302, the parameter setting module 112 sets particular parameters required for focusing images, and sets a start location and an end location for the moveable part of the measure machine 19. The particular parameters typically include a parameter regarding whether to filter consecutive images obtained by the CCD 16 while the moveable part of the measure machine 19 is moving, and a parameter regarding an image calculating region. The start location and the end location of the moveable part of the measure machine 19 are calculated according to an approximate focus location and a predetermined focusing area. The approximate focus location is generally determined by a user according to his/her experience. In step S304, the controlling card 13 transmits a controlling instruction to the Z axis motor 17, for the Z axis motor 17 to control the moveable part of the measure machine 19 to move within the predetermined focusing area from the start location. Meanwhile, the CCD 16 acquires consecutive images of the objects on the measure machine 19 by utilizing the optical lens 18, and the inputting/outputting module 111 retrieves electrical signals of the consecutive images from the CCD 16 via the image acquisition card 12. In step S306, the processing module 116 pretreats the consecutive images. The pretreatment may include clearing data temporarily stored in the data storing module 114 and filtering the consecutive images. In step S308, the calculating module 113 calculates definition values of the consecutive images according to pixel values of the consecutive images and by utilizing a calculating transform function. The pixel values are evaluated by using a gradient method. It should be noted that the better the gradient of two adjacent pixels, the better the image sharpening and fine distinction between white and black areas. The calculating transform function evaluates a sum of the absolute value of the difference between pixel values in four-square matrix pixels as below:

$$P1 = \sum_{X=1}^{N-2} \sum_{Y=1}^{N-2} \begin{bmatrix} |f(x,y) - f(x-1,y)| + \\ |f(x,y) - f(x,y-1)| + \\ |f(x,y) - f(x+1,y)| + \\ |f(x,y) - f(x,y+1)| \end{bmatrix}$$

In the above-described function, P1 is a sum of an absolute value of the difference between pixel values in a four-square matrix pixel. N is the total number of pixels of an image, and x and y are coordinates in a reference system. The data storing module 114 stores the calculated definition values and respective locations of the moveable part of the measure machine 19 temporarily in the data storage 20. In step S310, the determining module 115 determines whether the moveable part of the measure machine 19 has arrived at the end location, which is a final position of movement of the moveable part. If the moveable part has not arrived at the end location, the Z axis motor 17 controls the moveable part to keep on moving towards the end location. The procedure returns to step 304 described above, and the CCD 16 acquires new consecutive images of the objects accordingly. If the moveable part has arrived at the end location, that means the process of focusing images has been completed once, and then in step 312, the determining module 115 determines whether it is the second time to focus the images. If it is not the second time to focus the images, a new start location and a new end location are set according to the largest definition value of all the calculated definition values and the predetermined focusing area. Each image focusing location along the Z axis has a corresponding definition value, the largest definition value corresponds to a certain image focusing location along the Z axis, the certain image focusing location can be a center of a new region that is ranged between the new start location and the new end location. Then, the moveable part of the measure machine 19 moves to the new start location, and the procedure returns to step 304 described above. If it is the second time to focus the images, in step 314, the calculating module 113 calculates a focus location of the consecutive images according to the calculated definition values. Generally, the location of the moveable part corresponding to the largest definition value is the focus location. Then, the moveable part of the measure machine 19 moves to the focus location. In step 316, the inputting/outputting module 111 outputs the calculated focus location.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for automatic focusing of images, the system comprising a measure machine and a computer, wherein:
   the measure machine comprises a moveable part that moves along a Z axis of the measure machine, the moveable part being installed with a Charge Coupled Device (CCD) and a motor, the computer being connected with the CCD by an image acquisition card and connected with the motor by a controlling card; and
   the computer comprises:
   an inputting/outputting module for retrieving consecutive images of objects on the measure machine from the CCD, outputting instructions to the motor for controlling the moveable part to move within a predetermined focusing area, and outputting a focus location of the consecutive images;
   a parameter setting module for setting particular parameters required for focusing images, and setting a start location and an end location for the moveable part of the measure machine according to an approximate focus location and the predetermined focusing area, wherein the end location is a final position of movement of the moveable part;
   a determining module for determining whether the moveable part has arrived at the end location, and determining whether it is a second time to focus the images when the moveable part has arrived at the end location; and
   a calculating module for calculating definition values of the consecutive images according to image pixel values and by utilizing a predetermined calculating transform function for evaluating a sum of the absolute value of the difference between pixel values in four-square matrix pixels, and for calculating a corresponding focus location of the consecutive images according to the calculated definition values if it is the second time to focus the images.

2. The system according to claim 1, wherein the computer further comprises a processing module for analyzing and pretreating the consecutive images.

3. The system according to claim 1, wherein the computer further comprises a data storing module for storing the calculated definition values of the consecutive images and respective locations of the moveable part of the measure machine in a data storage.

4. The system according to claim 1, wherein the the image pixel values are evaluated by applying a gradient method.

5. A computer-based method for automatic focusing of images, the method comprising the steps of:
   providing a measure machine having a moveable part that moves along a Z axis of the measure machine;
   sending an instruction from a computer to a motor which is installed on the moveable part of the measure machine;
   setting particular parameters required for focusing images, and setting a start location and an end location for the moveable part of the measure machine, wherein the end location is a final position of movement of the moveable part;
   controlling the moveable part of the measure machine to move within a predetermined focusing area from the start location via the motor;
   retrieving consecutive images of objects on the measure machine acquired by a Charged Coupled Device (CCD) which is installed on the moveable part of the measure machine;
   pretreating the consecutive images;
   calculating definition values of the consecutive images according to image pixel values and by utilizing a predetermined calculating transform function for evaluating a sum of the absolute value of the difference between pixel values in four-square matrix pixels;
   determining whether the moveable part of the measure machine has arrived at the end location;
   determining whether it is a second time to focus the images, if the moveable part of the measure machine has arrived at the end location;
   calculating a corresponding focus location of the consecutive images according to the calculated definition values if it is the second time to focus the images; and
   outputting the calculated focus location.

6. The method according to claim 5, wherein the particular parameters comprise:
   a parameter regarding whether to filter the consecutive images; and
   a parameter regarding an image calculating region.

7. The method according to claim 5, wherein the step of pretreating the consecutive images comprises:
   clearing data stored in a data storage; and
   filtering the consecutive images.

8. The method according to claim 5, further comprising:
   controlling the moveable part to keep on moving towards the end location, if the Z axis has not arrived at the end location; and
   returning to the retrieving step.

9. The method according to claim 5, further comprising:
   setting a new start location and a new end location according to an image focusing location that corresponds to the largest definition value of all the calculated definition values, if it is not the second time to focus the images; and
   returning to the retrieving step.

* * * * *